United States Patent [19]

Sakai et al.

[11] Patent Number: 4,616,532

[45] Date of Patent: Oct. 14, 1986

[54] AUTOMATIC TRANSMISSION HYDRAULIC PRESSURE CONTROL SYSTEM WITH ONE-WAY FLUID DRAIN PASSAGE BYPASSING DOWNSHIFT TIMING SUBSYSTEM

[75] Inventors: Takahiro Sakai; Isamu Minemoto, both of Toyota, Japan

[73] Assignee: Toyota Jidosha Kabushiki Kaisha, Toyota, Japan

[21] Appl. No.: 574,144

[22] Filed: Jan. 26, 1984

[30] Foreign Application Priority Data

May 24, 1983 [JP] Japan .................................. 58-92096

[51] Int. Cl.$^4$ ............................................. B60K 41/16
[52] U.S. Cl. ...................................................... 74/869
[58] Field of Search ........................... 74/869, 868, 867

[56] References Cited

U.S. PATENT DOCUMENTS

| | | | |
|---|---|---|---|
| 3,688,608 | 9/1972 | Leach | 74/869 |
| 3,709,067 | 1/1973 | Ito | 74/869 |
| 3,733,932 | 5/1973 | Uozumi et al. | 74/869 |
| 3,754,483 | 8/1973 | Edmunds | 74/868 |
| 3,785,614 | 1/1974 | Enomoto | 74/869 |
| 3,792,763 | 2/1974 | Enomoto | 74/869 |
| 3,832,915 | 9/1974 | Hiramatsu | 74/869 |
| 4,161,895 | 7/1979 | Ushijima et al. | 74/867 |
| 4,296,651 | 10/1981 | Iwanaga et al. | 74/869 |
| 4,334,441 | 6/1982 | Iwanaga et al. | 74/869 |
| 4,395,926 | 8/1983 | Kubo et al. | 74/869 |
| 4,455,892 | 6/1984 | Sakakibara | 74/869 |

Primary Examiner—Lawrence J. Staab
Assistant Examiner—David A. Novais
Attorney, Agent, or Firm—Oblon, Fisher, Spivak, McClelland & Maier

[57] ABSTRACT

An automatic transmission has first and second pressure actuated friction engaging devices to provide a lower speed stage when the first friction engaging device is engaged and the second friction engaging device is disengaged, or vice versa; a speed shift valve which changes over supplying and exhausting hydraulic fluid pressure to and from the first and second friction engaging devices; a downshift timing system which provides lower flow resistance at lower road speed and higher flow resistance at higher road speed in a passage for supplying hydraulic fluid pressure to the first friction engaging device; an upshift timing system which provides higher flow resistance to a passage for exhausting hydraulic fluid pressure from the first friction engaging device before the hydraulic fluid pressure in the second friction engaging device increases to a predetermined value and lower flow resistance to the same drain passage when the hydraulic fluid pressure in the second friction engaging device has increased to the predetermined value; and a bypass passage which incorporates a one way valve and conducts hydraulic fluid from the first friction engaging device towards the speed shift valve by bypassing the downshift timing system.

1 Claim, 1 Drawing Figure

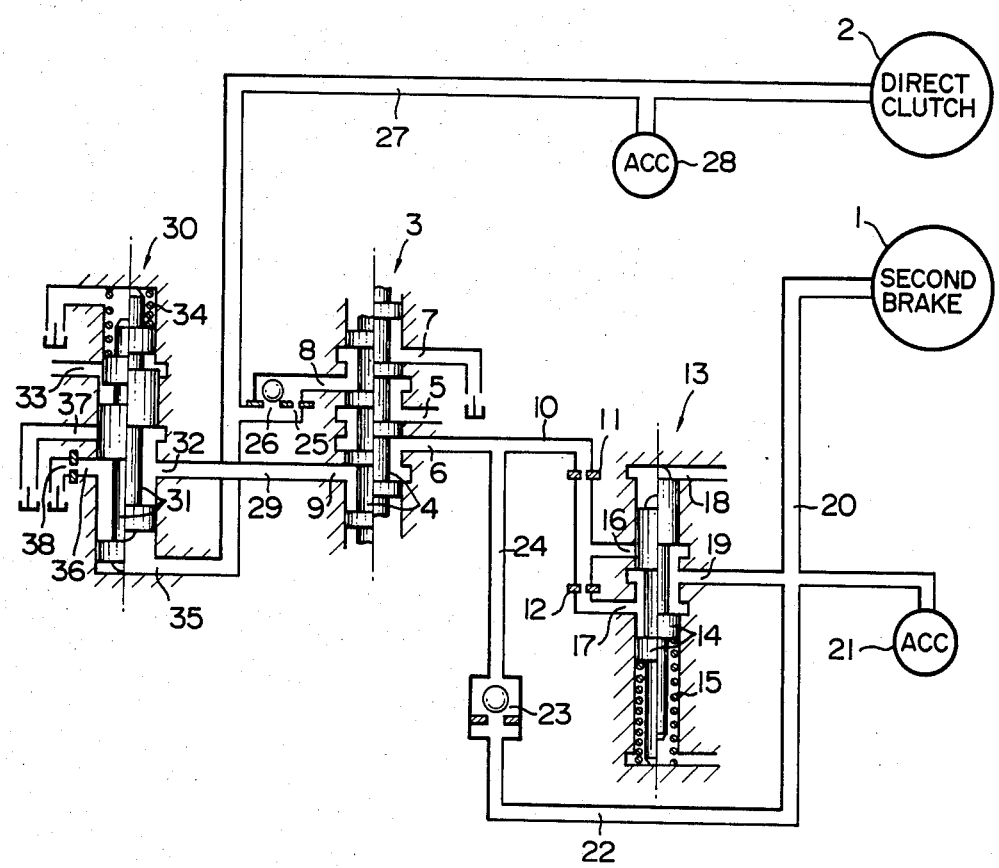

AUTOMATIC TRANSMISSION HYDRAULIC PRESSURE CONTROL SYSTEM WITH ONE-WAY FLUID DRAIN PASSAGE BYPASSING DOWNSHIFT TIMING SUBSYSTEM

BACKGROUND OF THE INVENTION

1. Field of the Invention

The present invention relates to a hydraulic fluid pressure control system, included in an automatic transmission, for controlling the shifting operation of a gear transmission mechanism which includes a plurality of friction engaging devices, and more particularly relates to an improvement of such a hydraulic fluid pressure control system, in which a downshift timing subsystem is provided for ensuring good downshift timing from a certain speed stage of the gear transmission mechanism to the next lower speed stage.

2. Discussion of the Background

Various different types of gear transmission mechanism are used in automatic transmissions, and in these gear transmission mechanisms typically each of the speed stages is provided by supplying and exhausting actuating hydraulic fluid pressure to and from particular appropriate hydraulic pressure actuated friction engaging devices such as hydraulic clutches and hydraulic brakes, incorporated in the gear transmission mechanism. In the typical and often used gear transmission mechanisms, a certain lower speed stage is provided by a first friction engaging device being supplied with hydraulic fluid pressure to be engaged thereby and a second friction engaging device is not supplied with hydraulic fluid pressure to be disengaged thereby, and a certain higher speed stage is provided by the supply and the non supply of hydraulic fluid pressure to said first and second friction engaging devices being reversed. This type of speed stage shifting for a gear transmission mechanism is generally referred to as switchover shifting. Typically, such a hydraulic pressure control system includes a speed stage shift valve adapted to be operated by the balance between the governor hydraulic fluid pressure which represents the current road speed of the vehicle and the throttle pressure which represents the current engine load.

When a gear transmission mechanism of the switchover shifting type is shifted down from a higher speed stage to a lower speed stage, the hydraulic fluid pressure which has been supplied to said second friction engaging device is drained while hydraulic fluid pressure is newly supplied to said first friction engaging device. In this case, if the vehicle speed at the time of starting the downshifting is higher more time is required for accomplishing the downshifting without causing any undesirable shocking. Therefore, it is desirable that the supply of hydraulic fluid pressure to said first friction engaging device during the downshifting should be done more gradually as the vehicle speed at the beginning of the downshifting is higher. In order to effect such control, it has already been proposed to incorporate a downshift timing control valve in the passage for supplying and exhausting hydraulic fluid pressure to said first friction engaging device, said downshift timing control valve being adapted to respond to the governor pressure so as to apply an additional flow resistance to said passage when the governor pressure is higher than a predetermined level.

However, such downshift timing control valve incorporated in the passage for supplying and exhausting hydraulic fluid pressure to and from said first friction engaging device inevitably increases the overall minimum flow resistance of the passage, and it was found by the inventors of the present application that the increase of the minimum flow resistance of said passage caused by the provision of the downshift timing control valve delays the exhausting of hydraulic fluid pressure from said first friction engaging device during upshifting of the gear transmission beyond a limit acceptable to adjust the timing during upshifting to be optimum in addition to the adjustment of the downshift timing.

SUMMARY OF THE INVENTION

Accordingly, it is the primary object of the present invention to provide an automatic transmission hydraulic pressure control system, which can provide proper timings for engagement and disengagement of a lower speed friction engaging device in both downshifting and upshifting.

It is a further object of the present invention to provide such an improved automatic transmission hydraulic pressure control system as mentioned above by a mere addition of a simple device to the conventional system incorporating a conventional downshift timing control valve.

According to the present invention, the abovementioned objects are accomplished by, in an automatic transmission including a gear transmission mechanism comprising first and second hydraulic pressure actuated friction engaging devices, which provides a certain lower speed stage when said first friction engaging device is engaged by supply of actuating hydraulic fluid pressure thereto and said second friction engaging device is engaged by non-supply of actuating hydraulic fluid pressure thereto, and which provides a certain higher speed stage when said first friction engaging device is disengaged by non-supply of actuating hydraulic fluid pressure thereto and said second friction engaging device is engaged by supply of actuating hydraulic fluid pressure thereto: a hydraulic fluid pressure control system, comprising: (a) a source of line hydraulic fluid pressure; (b) a first and a second drain passage; (c) a first hydraulic fluid passage having a first end connected with said first friction engaging device and a second end; (d) a second hydraulic fluid passage having a first end connected with said second friction engaging device and a second end; (e) a speed shift valve which is selectively positioned either to a first position, in which it connects said second end of said first hydraulic fluid passage to said source of line hydraulic fluid pressure and said second end of said second hydraulic fluid passage to said second drain passage, or to a second position, in which it connects said second end of said second hydraulic fluid passage to said source of line hydraulic fluid pressure and said second end of said first hydraulic fluid pressure to said first drain passage; (f) downshift timing control means incorporated at a middle portion of said first hydraulic fluid passage for providing a relatively low through flow resistance when road speed is less than a certain predetermined value and a relatively high through flow resistance when road speed is greater than said certain predetermined value; and (g) a bypass passage connected to said first hydraulic fluid passage so as to bypass said downshift timing control means and a one way valve incorporated in said bypass passage so as to allow fluid to flow through said bypass passage only in a direction from said first friction engaging device towards said speed shift valve.

BRIEF DESCRIPTION OF THE DRAWING

The present invention will now be described with reference to the preferred embodiment thereof, and with reference to the appended drawing. It should be understood, however, that the scope of the present invention is not to be considered as limited by any of the features of the embodiment shown, or of the drawing, which are given for the purposes of illustration and exemplification only, but is to be defined solely by the accompanying claims. In the drawing, the sole FIGURE thereof is a schematic diagram of an essential part of said preferred embodiment of the hydraulic fluid pressure control system for an automatic transmission of the present invention, showing several transmission valves incorporated therein in longitudinal cross section, and also schematically showing the part of an automatic transmission which is controlled thereby.

DESCRIPTION OF THE PREFERRED EMBODIMENT

In the sole FIGURE of the drawing, two friction engaging devices are shown as designated by the reference numerals 1 and 2. In fact, 1 represents a second speed stage brake, while 2 indicates a third or direct speed stage clutch, and the automatic transmission incorporating them (not otherwise shown) is caused to provide its second speed stage by the brake 1 being engaged by actuating pressure being supplied to a pressure chamber thereof (not particularly shown) and by the clutch 2 being disengaged by actuating pressure not being supplied to a pressure chamber thereof (not particularly shown either), while on the other hand said transmission is caused to provide its third speed stage by the brake 1 being disengaged by no pressure being supplied to said pressure chamber thereof and by the clutch 2 being engaged by actuating pressure being supplied to said pressure chamber thereof. Each of these friction engaging devices 1 and 2 is of a per se well known construction.

Selective supply of actuating hydraulic pressure to the pressure chambers of the friction engaging devices 1 and 2 is performed by a second/third switching valve 3, which is a spool type transmission valve comprising a body formed with a bore within which is mounted a valve element 4 which can slide in said bore upward and downward as seen in the FIGURE, as shown on the right and the left side of the central axis of the valve 3 in the FIGURE. A throttle pressure, which is produced by a per se well known throttle pressure control valve so as to be proportional (within a limit) to the amount of depression of a throttle pedal of the vehicle incorporating this transmission, is supplied to the second/third switching valve 3 so as to bias the valve element 4 thereof downward in the FIGURE; and, similarly, a governor pressure, which is produced by a per se well known governor pressure control valve so as to be proportional (within a limit) to the current road speed of said vehicle, is also supplied to the second/third switching valve 3 so as to bias the valve element 4 thereof upward in the FIGURE. Thereby, said valve element 4 is shifted to its upward position, when the governor pressure prevails over the throttle pressure, and on the other hand is shifted to its downward position, when the throttle pressure prevails over the governor pressure; this shifting action action is per se well known and conventional.

When the valve element 4 of the second/third switching valve 3 is shifted to its upward position, a port 5 thereof which is continuously supplied with a line pressure is communicated to a port 8 which as will be seen later is communicated to the pressure chamber of the friction engaging device 2, while a port 9, which is drained as will be seen later, is communicated to a port 6, which as will also be seen later is communicated to the pressure chamber of the friction engaging device 1; and accordingly said friction engaging device 2 is engaged by supply of actuating pressure to its pressure chamber, while said friction engaging device 1 is disengaged by draining of its pressure chamber, and thus the third speed stage of the transmission is engaged. On the other hand, when the valve element 4 of the second/third switching valve 3 is shifted to its downward position, the port 5 is communicated to the port 6, while the port 8 is communicated to a port 7 which is directly drained; and accordingly said friction engaging device 1 is engaged by supply of actuating hydraulic fluid pressure to its pressure chamber, while said friction engaging device 2 is disengaged by draining of its pressure chamber, and thus the second speed stage of the transmission is engaged.

In more detail, the connections of the five ports of the second/third switching valve 3 are as follows: the line pressure port 5 is connected to a constant source of line pressure; the second speed stage port 6 is connected to the pressure chamber of the friction engaging device 1 via a hydraulic fluid conduit 10, a downshift timing subsystem comprising a downshift timing valve 13, and a hydraulic fluid conduit 20; the third speed stage drain port 7 is connected directly to a hydraulic fluid drain; the third speed stage port 8 is connected to the pressure chamber of the friction engaging device 2 via the parallel combination of a throttling element 25 and a one way valve 26, and then via a hydraulic fluid conduit 27; and the second speed stage drain port 9 is connected to drain via a hydraulic fluid conduit 29 and an upshift timing subsystem comprising a upshift timing valve 30. Hydraulic fluid accumulators 21 and 28 are connected to intermediate points on the conduits 20 and 27 respectively, for cushioning the supply of hydraulic fluid pressure to the friction engaging devices 1 and 2 as will be explained hereinafter; and a return hydraulic fluid conduit 22, with a one way valve 23 (which may be of a check ball type) at an intermediate point therealong, is provided as leading from an intermediate point on the conduit 20 to an intermediate point on the conduit 10: this particularly relates to the gist of the present invention.

Now, the construction of the downshift timing subsystem comprising the downshift timing valve 13 will be explained. This valve 13 is also a spool type transmission valve comprising a body formed with a bore within which is mounted a valve element 14 which can slide in said bore upward and downward as seen in the FIGURE, as shown on the right and the left side of the central axis of the valve 13. Governor pressure is supplied to a port 18 so as to bias the valve element 14 downward with a force proportional to the magnitude of said governor pressure; and a compression coil spring 15 biases the valve element 14 upward with a substantially constant force. Thereby, said valve element 14 is shifted to its upward position when the force of said spring 15 prevails over the governor pressure, i.e. when the road speed of the vehicle is less than a certain threshold value, and on the other hand is shifted to its downward position when the governor pressure prevails over the force of said spring 15, i.e. when the road speed of the vehicle is greater than said threshold value.

When the valve element 14 is shifted to its upward position, ports 16 and 17 thereof are both communicated to a port 19. The port 16 is connected to the conduit 10 via a throttling element 11; and the port 17 is connected to the port 16 via another throttling element 12 and thus is connected to the conduit 10 via the series combination of the throttling elements 11 and 12. Accordingly in this operational condition the port 19 is communicated to the conduit 10 directly via the throttling elements 11, thus with a certain relatively low flow resistance. On the other hand, when the valve element 14 is shifted to its downward position, only the port 17 is communicated to the port 19; and accordingly in this operational condition the port 19 is communicated to the conduit 10 via the series combination of the throttling elements 11 and 12, thus with a certain relatively high flow resistance. The port 19 is connected to the hydraulic fluid conduit 20 which leads to the pressure chamber of the friction engaging device 1. This construction for a downshift timing subsystem and the operation thereof available from this construction are per se well known and conventional. The operation is to delay supply of hydraulic fluid pressure to the lower speed friction engaging device 1 during downshifting when the road speed of the vehicle at the start of downshifting is higher than a predetermined value as compared to the case where the road speed of the vehicle at the start of downshifting is less than the predetermined value.

An intermediate part of the conduit 20 is connected to the upstream end of the return hydraulic fluid conduit 22, the downstream end of which is connected to an intermediate point on the conduit 10, with the one way valve 23 being interposed in the return conduit 22 at an intermediate point therealong. This means that, in summary, the conduit 20 is communicated to the conduit 10 with a certain very low flow resistance at all times with regard to flow of hydraulic fluid from the conduit 20 to the conduit 10. By the provision of the return hydraulic fluid conduit 22 incorporating the one way valve 23 exhausting of hydraulic fluid pressure from the friction engaging device 1 toward the second/third switching valve 3 during upshifting from the second speed stage to the third speed stage is performed under a very low flow resistance so as to disengage the friction engaging device 1 so quickly as to provide an optimum upshift timing.

This upshift timing valve 30 is also a spool type transmission valve comprising a body formed with a bore within which is mounted a valve element 31 which can slide in said bore upward and downward as seen in the FIGURE, as shown on the right and the left side of the central axis of said valve 30 in the FIGURE. The actuating pressure supplied to the pressure chamber of the friction engaging device 2 is also supplied to a port 35 at the bottom in the FIGURE of the upshift timing valve 30 so as to bias the valve element 31 upward in the FIGURE with a force proportional to the magnitude of said actuating pressure; and a compression coil spring 34 biases the valve element 31 downward in the FIGURE with a substantially constant force. Further, another biasing force is applied to the valve element 31 by the throttle pressure being supplied to a port 33 which opens between two lands of said valve element 31 which are of different diameters. Thereby, said valve element 31 is shifted to its downward position, when the sum of the force of said spring 34 and the force due to said throttle pressure supplied to the port 33 prevails over the actuating pressure for the friction engaging device 2, i.e. when said actuating pressure is less than some certain threshold value (which actually depends on the current value of the throttle pressure), and on the other hand is shifted to its upward position, when the actuating pressure for the friction engaging device 2 prevails over said sum of the force of said spring 34 and the force due to said throttle pressure, i.e. when said actuating pressure is greater than said certain threshold value.

When the valve element 31 is shifted to its downward position, a port 32 is communicated to a port 36, while a port 37 is communicated to no other port. The port 36 is connected to a hydraulic fluid drain via a throttling element 38; and the port 37 is connected directly to a hydraulic fluid drain. Accordingly in this operational condition the port 32 is communicated to a hydraulic fluid drain via the throttling element 38, thus with a certain relatively high flow resistance. On the other hand, when the valve element 31 is shifted to its upward position, the port 32 is communicated to both the port 36 and the port 37; and accordingly in this operational condition the port 32 is communicated to drain directly, thus with a certain relatively low flow resistance. The port 32 is connected to the conduit 29 which leads to the second speed stage drain port 9 of the second/third switching valve 3. This means that, in summary, the second speed stage drain port 9 is connected to a hydraulic fluid drain with a certain substantially high flow resistance before the actuating pressure for the friction engaging device 2 becomes greater than said threshold value, and with a very low flow resistance when the actuating pressure for the friction engaging device 2 has increased beyond said threshold value. This construction for an upshift timing subsystem and the operation thereof available from this construction are per se well known and conventional. The operation is to take the timing of release of the hydraulic fluid pressure in the friction engaging device 1 in relation to build up of hydraulic fluid pressure in the friction engaging device 2 so as first gradually to release the hydraulic fluid pressure in the friction engaging device 1 until the hydraulic fluid pressure in the friction engaging device 2 reaches a predetermined value and then secondly quickly release the hydraulic fluid pressure from the friction engaging device 1 so as quickly to disengage it.

In this second stage of the upshift speed shifting in order to obtain a smoother shockless upshifting with less wearing of the friction engaging devices 1 and 2, it was found that the release of the hydraulic fluid pressure from the friction engaging device 1 should be done at a relatively high rate. In the upshift timing valve 30 such high rate releasing of the hydraulic fluid pressure is available by the port 32 being connected to both the ports 36 and 37, wherein the port 37 is directly drained with no throttling means incorporated therein. This high rate pressure releasing performance in the second stage of the upshifting available by the upshift timing valve 30 is effectively utilized when the return hydraulic fluid conduit 22 including the one way valve 23 is provided so as to conduct hydraulic fluid from the friction engaging device 1 toward the drain passage through the upshift timing valve 30 by bypassing the downshift timing subsystem including the downshift timing valve 13 and the throttling elements 11 and 12, said subsystem being designed to provide a desirable flow resistance to the hydraulc fluid flow conducted therethrough from the second/third switching valve 3 toward the friction engaging device 1.

Now, the operation of this preferred embodiment of the hydraulic fluid pressure control system for an automatic transmission according to the present invention will be explained.

First, when the transmission of the vehicle is set to and is functioning in the second speed stage, then the valve element 4 of the second/third switching valve 3 is positioned to its downward position, and accordingly the line pressure supplied to the port 5 is supplied through the port 6 to the pressure chamber of the friction engaging device 1 via the conduit 10, the downshift timing subsystem comprising the downshift timing valve 13 which is shifted either to its upward or downward position, and the conduit 20, and accordingly said friction engaging device 1 is engaged; and further the port 8 of the second/third switching valve 3 is communicated to the port 7 which is directly drained, and so the pressure chamber of the friction engaging device 2 is communicated to drain via the conduit 27 and the one way ball check valve 26 and the second/third switching valve 3, and accordingly said friction engaging device 2 is disengaged. At this time the hydraulic pressure in the conduit 27 is substantially zero, and accordingly the valve element 31 of the upshift timing valve 30 is in its downward position with the port 32 thereof only communicated to the port 36 and not to the port 37.

Now, supposing that the relationship between the throttle pressure and the governor pressure as they act on the valve element 4 of the second/third switching valve 3 shifts by the alteration of either or both of them, so that the governor pressure now prevails over the throttle pressure, in this case, the valve element 4 will shift to its upward position from the point of view of the FIGURE, and accordingly at this time the port 5 of the second/third switching valve 3 will become connected to the port 8, while the port 6 will become connected to the port 9. This shift of the valve element 4 initiates the upshifting process. The communication of the port 5 to the port 8 means that a flow of hydraulic fluid starts to be supplied from the port 8 through the throttling element 25 and the conduit 27 to the pressure chamber of the second friction engaging device 2 as well as to the accumulator 28, and accordingly the value of the pressure in this pressure chamber starts to progressively rise, thus progressively engaging the friction engaging device 2 gradually until it is fully engaged with said pressure in its pressure chamber substantially equal to the line pressure, at a pressure rate of increase determined by the effective flow resistance of said throttling element 25 and the characteristics of the accumulator 28.

First, in the first stage of this upshifting process, with the port 6 of the second/third switching valve 3 communicated to the port 9 thereof, the pressure chamber of the first friction engaging device 1 and the accumulator 21 are communicated to drain via the conduit 20, the bypass hydraulic fluid conduit 22 and the one way valve 23 (although some parallel flow may also take place through the downshift timing control subsystem comprising the downshift timing valve 13, but this is irrelevant), the second/third switching valve 3, the conduit 29, the port 32 of the upshift timing valve 30, the port 36 thereof only, and the throttling element 38. This draining is therefore accomplished at a relatively low rate, determined by the effective flow resistance of said throttling element 38 and the characteristics of the accumulator 21. This ensures that the first friction engaging device 1, in this first stage of upshifting, is continue to able to transmit a certain amount of torque, until the pressure in the pressure chamber of the second friction engaging device 2 rises to said certain threshold value.

When, however, said pressure supplied to the second friction engaging device 2 and present in the hydraulic fluid conduit 27 rises up to said threshold value, and accordingly said second friction engaging device 2 is engaged to some considerable extent, then the valve element 31 of the upshift timing valve 30 shifts to its upward position under the biasing effect of this pressure supplied to its port 35, and the port 32 thereof becomes communicated to the port 37 as well as to the port 36. As a result, the pressure chamber of the first friction engaging device 1 and the accumulator 21 are now communicated, via the conduit 20, the bypass hydraulic fluid conduit 22 and the one way valve 23 (again with some parallel flow perhaps occurring through the downshift timing valve 13), the second/third switching valve 3, the conduit 29, the port 32 of the upshift timing valve 30, and the port 37, directly to drain, with no throttling effect being provided by any throttlng element and accordingly with a relatively low flow resistance. This draining is therefore accomplished at a relatively high speed, and accordingly in this second stage of upshifting the pressure chamber of the first friction engaging device 1 is quickly drained to a substantially zero pressure, thus quickly disengaging the first friction engaging device 1, once as explained above the second friction engaging device 2 has become engaged to a particular considerable extent corresponding to the threshold value defined by the characteristics of the upshift timing valve 30 (in combination with the particular current value of throttle pressure).

Accordingly, it is particularly avoided that both the first friction engaging device 1 and the second friction engaging device 2 are engaged at the same time, so as to cause the poor drivability and the transmission damage which would likely be attendant on such double engagement. This is particularly possible due to the provision of the bypass conduit 22 with the one way valve 23 included therein, which make it possible to quickly drain the pressure chamber of the first friction engaging device 1 during the latter stage of upshifting, in spite of the provision of the downshift timing control subsystem including the downshift timing valve 13, which operates effectively during downshifting from the third speed stage to the second speed stage, but would interfere with the operation of the upshift timing control subsystem with its relatively high flow resistance, if the bypass conduit 22 and the one way valve 23 were not provided.

Now, the operation of the shown downshift timing control system will be explained. Supposing that the transmission of the vehicle is functioning in the third speed stage, with the valve element 4 of the second/third switching valve 3 positioned to its upward position from the point of view of the FIGURE with the governor pressure prevailing in its biasing effect thereon; so that line pressure is being supplied from the port 5 of said second/third switching valve 3 to the port 8 which is connected to the pressure chamber of the friction engaging device 2 via the conduit 27, so as to engage said friction engaging device 1; and so that further the port 6 of the second/third switching valve 3 is communicated to the port 9 so as to drain the pressure chamber of the friction engaging device 1 via the bypass conduit 22 and the one way valve 23 as explained above, so that said friction engaging device 2 is disengaged. Now, supposing that the relationship between the throttle pressure and the governor pressure as they act on the valve element 4 of the second/third switching valve 3 shifts by the alteration of either or both of them, so that the throttle pressure now prevails over the governor pressure (or that alternatively a forced downshift is initiated by a mechanism not shown in the FIGURE). In this case, the valve element 4 will shift to its downward position from the point of view of the FIGURE, and accordingly now the port 7 of the second/third switching valve 3 will become connected to the port 8, while the port 6 will now become connected to the port 5. This initiates the downshifting process. The communication of the port 7 to the port 8 means that the pressure chamber of the second friction engaging device 2 and the accumulator 28 are drained relatively quickly, via the conduit 27 and the one way ball valve 26, thus progressively disengaging the friction engaging device 2; and the connection of the port 5 to the port 6 means that a flow of hydraulic fluid starts to be supplied from the port 6 through the conduit 10 and the throttling element 11 to the port 16 of the downshift timing valve 13 and also further via the throttling element 12 to the port 17 thereof. It should be noted that because of the provision of the one way valve 23 no fluid flow through the bypass conduit 22 towards the pressure chamber of the friction engaging device 1 and the accumulator 21 can occur; thus the provision of the one way valve 23 is absolutely essential to the present invention.

In the case where the vehicle road speed is relatively high, then the valve element 14 of the downshift timing valve 13 is in its downward position from the point of view of the FIGURE, and the port 19 of this valve is connected only to the port 17 thereof and not to the port 16, and accordingly the flow of line pressure to the pressure chamber of the friction engaging device 1 and the accumulator 21 is forced to take place through the series combination of the throttling elements 11 and 12 which has a relatively high flow resistance; and accordingly the downshift process is accomplished relatively slowly. On the other hand, if the vehicle road speed is relatively low, then the valve element 14 of the downshift timing valve 13 is in its upward position, and the port 19 of this valve is connected to the port 16 thereof as well as to the port 17, and accordingly the flow of line pressure to the pressure chamber of the friction engaging device 1 and the accumulator 21 is able to take place through the throttling element 11 only, which has a relatively high flow resistance; and accordingly the downshift process is accomplished relatively quickly. Thus, in summary, when the vehicle road speed is high, the first friction engaging device is engaged relatively less quickly than when the vehicle road speed is low. This is effective for minimizing tranmsmission shift shock, as explained previously.

Although the present invention has been shown and described with reference to the preferred embodiment thereof, and in terms of the illustrative drawing, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown preferred embodiment, or of the drawing, but solely by the scope of the appended claims, which follow.

What is claimed as new and desired to be secured by Letters Patent of the United States is:

1. In an automatic transmission including a gear transmission mechanism comprising a first and a second hydraulic pressure actuated friction engaging device, which provides a certain lower speed stage when said first friction engaging device is engaged by supply of actuating hyraulic fluid pressure thereto and said second friction engaging device is disengaged by non-supply of actuating hydraulic fluid pressure thereto, and which provides a certain higher speed stage when said first friction engaging device is disengaged by non-supply of actuating hydraulic fluid pressure thereto and said second friction engaging device is engaged by supply of actuating hydraulic fluid pressure thereto, a hydraulic fluid pressure control system, comprising:
a speed shift valve having a first, a second, a third, a fourth, and a fifth port, and a first valve element selectively positioned either to a first position to communicate said first port with said second port and said fourth port with said fifth port, respectively, or to a second position to communicate said first port with said fourth port and said second port with said third port, respectively, said first port being supplied with a line pressure, while said fifth port is open to drain;
a downshift timing valve having a first port passage, and a second valve element driven by a governor pressure from a third position toward a fourth position against a biasing force so as to interrupt communication of said first port passage when the governor pressure is larger than a predetermined value;
an upshift timing valve having a second port passage, a sixth port, and a third valve element driven by a throttle pressure from a fifth position toward a sixth position against a force applied by a fluid pressure supplied to said sixth port so as to interrupt communication of said second port passage when the balance between the throttle pressure and the fluid pressure supplied to said sixth port is smaller than a predetermined value;
a first hydraulic pressure system for operating said first friction engaging device in relation to said second friction engaging device, including a first passage system which connects said first friction engaging device with said second port, a second passage system which drains said third port, and a third passage system for interrelating operation of said first friction engaging device with that of said second friction engaging device, said first passage system including a parallel connection of a first and a second passage at a middle portion thereof, said first passage including a parallel connection of said first port passage and a first throttling element at a middle portion thereof and further a second throttling element connected in series with said parallel connection of said first port passage and said first throttling element at a middle portion thereof, said second passage including a first one way valve at a middle portion thereof, said first one way valve allowing fluid to flow therethrough only in a direction from said first friction engaging device toward said second port, said second passage system including a third passage which includes a parallel connection of said second port passage and a third throttling element therein, said third passage system including a fourth passage which connects said sixth port with said second friction engaging device; and a second hydraulic pressure system for operating said second friction engaging device, including a fifth passage which connects said second friction engaging device with said fourth port, said fifth passage including a parallel connection of a fourth throttling element and a second one way valve at a middle portion thereof, said second one way valve allowing fluid to flow therethrough only in a direction from said second friction engaging device toward said fourth port.

* * * * *